United States Patent
Manak

[11] Patent Number: 5,923,096
[45] Date of Patent: Jul. 13, 1999

[54] ALL-ELECTRIC VEHICLE CONTROL SYSTEM

[75] Inventor: Richard T. Manak, Brooklyn, N.Y.

[73] Assignee: Manak Dynamics Engineering Corp., Brooklyn, N.Y.

[21] Appl. No.: 08/843,555

[22] Filed: Apr. 18, 1997

[51] Int. Cl.$^6$ ........................................... B60L 1/00
[52] U.S. Cl. ............................ 307/10.1; 701/41; 701/70; 180/65.1; 280/DIG. 5
[58] Field of Search ..................................... 307/9.1, 10.1, 307/10.6, 10.7, 10.8; 701/36, 41, 48, 70, 93; 180/54.1, 65.1–65.8; 280/DIG. 5; 340/425.5, 438, 439, 441, 444, 455

[56] References Cited

U.S. PATENT DOCUMENTS

| | | |
|---|---|---|
| 1,928,915 | 10/1933 | Stout . |
| 2,482,203 | 9/1949 | Peterson et al. . |
| 2,586,273 | 2/1952 | Steven . |
| 2,839,168 | 6/1958 | Cosper . |
| 3,179,199 | 4/1965 | Moran . |
| 3,566,986 | 3/1971 | Udden . |
| 3,613,813 | 10/1971 | Biddle . |
| 3,955,639 | 5/1976 | Cragg . |
| 4,387,325 | 6/1983 | Klimo .................................... 318/71 |
| 4,415,049 | 11/1983 | Wereb .................................... 180/6.5 |
| 4,476,949 | 10/1984 | Patton . |
| 4,476,954 | 10/1984 | Johnson et al. ........................ 180/65.5 |
| 4,483,405 | 11/1984 | Noda et al. . |
| 4,722,416 | 2/1988 | Ahnafield ............................... 180/333 |
| 4,805,711 | 2/1989 | Lautzenhiser . |
| 4,805,712 | 2/1989 | Singleton . |
| 4,825,971 | 5/1989 | Bernstein .............................. 180/65.1 |
| 4,893,037 | 1/1990 | Schwartz . |
| 4,949,408 | 8/1990 | Trkla . |
| 5,022,476 | 6/1991 | Weege . |
| 5,042,314 | 8/1991 | Rytter et al. . |
| 5,058,016 | 10/1991 | Davidovitch ............................. 180/6.5 |
| 5,090,929 | 2/1992 | Rieben ..................................... 440/40 |
| 5,117,102 | 5/1992 | Mitchell ................................. 250/221 |
| 5,139,121 | 8/1992 | Kumura et al. . |
| 5,253,724 | 10/1993 | Prior ..................................... 180/65.5 |
| 5,366,036 | 11/1994 | Perry . |
| 5,413,187 | 5/1995 | Kruse et al. . |
| 5,499,694 | 3/1996 | Dorn ..................................... 187/200 |

*Primary Examiner*—Jeffrey Gaffin
*Assistant Examiner*—Jonathan Kaplan
*Attorney, Agent, or Firm*—Eugene Stephens & Associates

[57] ABSTRACT

An all-electric vehicle control system arranges operator interface controls at a console between a pair of seats, either of which can be used by an operator. The console controls include a joystick arranged in communication with an electronic motor control system for driving and regeneratively braking the vehicle wheels. The joystick is also in communication with an electronic servo amplifier and an electric servo actuator that steers the vehicle electromechanically and provides a closed loop feedback circuit for steering control. Electromagnetically actuated brakes are interposed between drive wheels and electric drive motors and are energized automatically whenever the vehicle rolls to a stop, thereby holding the vehicle still. The console also includes a dynamic brake switch that can energize the electromagnetic brakes for decelerating the vehicle in conjunction with regenerative braking. A console-mounted override switch disengages the electromagnetic brakes when the vehicle is stopped so that the vehicle can be moved with external power.

23 Claims, 8 Drawing Sheets

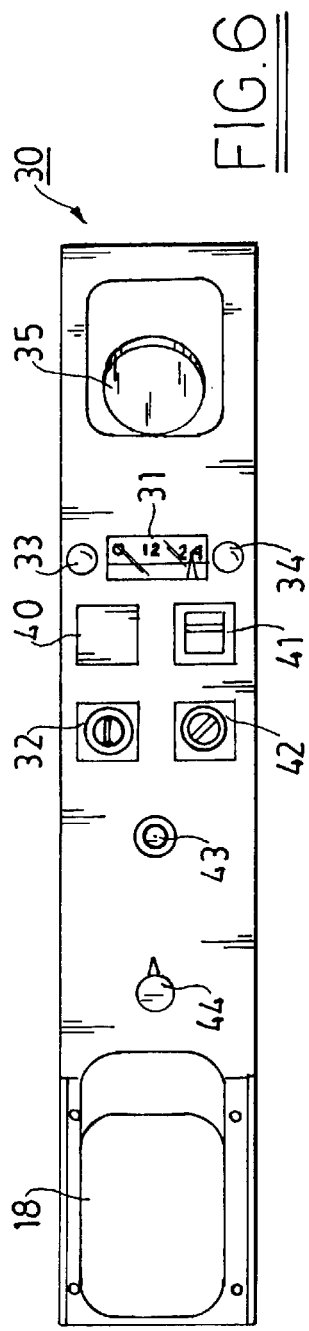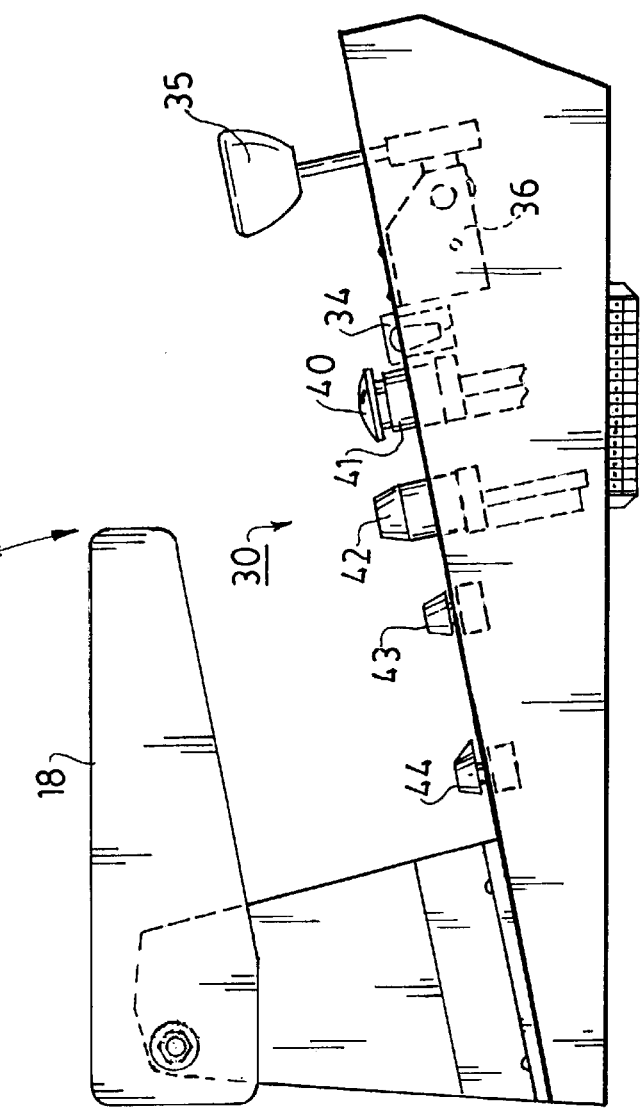

ND-ELECTRIC VEHICLE CONTROL SYSTEM

ALL-ELECTRIC VEHICLE CONTROL SYSTEM

TECHNICAL FIELD

Electric control system for electromechanically operating a vehicle.

BACKGROUND

Many electrically driven vehicles have been proposed for capacities ranging from single person wheelchairs to two person golf cars and larger. Drive, braking, steering, and control systems for such vehicles have been suggested in a multitude of forms, all of which have suffered various drawbacks.

I have discovered an improvement in an electric vehicle control system that accomplishes driving, braking, and steering effectively in a responsive, convenient, and safe way. My control system allows operation of an electric vehicle by persons with or without disabilities to afford versatile and comfortable transportation. My control system and related components of an electric vehicle also accomplish these goals at moderate cost so that a vehicle operated with my control system can be competitively priced.

SUMMARY OF THE INVENTION

An operator interface of my improved control system centers on a console arranged between a pair of seats, either of which can be used by an operator of the vehicle. This allows right-handed or left-handed driving via a joystick and other controls arranged on the console. The available option of driving with either hand from either seat is especially important for people with disabilities.

A pair of drive motors drive respective wheels of the vehicle, and electromagnetically applied brakes are arranged between each of the motors and the respectively driven wheel. In response to operator intention input at the joystick, a vehicle control system communicating with the motors appropriately rotates the wheels and regeneratively brakes the wheels for slowing the vehicle down when the joystick is released. The control system also actuates the brakes whenever the vehicle wheels are not rotating so that the vehicle is held still when it comes to a stop. The control system releases the brakes in response to a joystick signal for movement and applies current to the motors in the appropriate sense for moving the vehicle in the direction indicated by the joystick. In effect, the control system applies the brakes whenever the vehicle comes to a stop and releases the brakes whenever the vehicle starts in motion.

The operator preferably has a dynamic brake switch at the console near the joystick so that the operator can apply the electromagnetic brakes via the dynamic brake switch for decelerating the vehicle more rapidly while it is being regeneratively braked by the motors. A power switch, also preferably arranged on the console, communicates with the control system for applying the electromagnetic brakes when power is switched off. In effect, this sets a parking brake automatically when the vehicle is not being operated. A parking brake override switch can deactivate the brakes for moving the vehicle with external power.

The control system also steers the vehicle front wheels electromechanically through a joystick controller, servo amplifier, servo actuator, and steering position feedback potentiometer. The servo amplifier, controlled by the joystick controller, powers the electromechanical servo actuator to change the front end geometry, for steering the vehicle in the direction of movement of the joystick.

The steered wheels' position is sensed by the steering position feedback potentiometer, which creates a position signal that is sent back to the servo amplifier. When the steering angle is equal to the angle of the joystick, the input and feedback signals to the servo amplifier cancel out and the vehicle steers in the desired direction. Since the steering angle of the joystick always equals the steering angle of the front wheels, the operator thereby has precise control of steering of the vehicle. The joystick is spring loaded to the zero angle null position corresponding to zero angle steering position of the front wheels. When the joystick is released and springs back to the zero angle position, the front wheels automatically return to the straight-ahead position.

This directional control system also contains speed control for action of the servo actuator, thereby providing for either "faster" or "slower" excursion of the movement of the front wheels from stop to stop. This adjustment contributes to safe operation for operators of different ability.

DRAWINGS

FIG. 1 is a side elevational view of a preferred embodiment of an all-electric vehicle using the inventive control system.

FIGS. 2, 3, and 4 are respectively front, rear, and top views of the vehicle of FIG. 1.

FIG. 5 is a partially schematic, elevational view of a control console used in the vehicle of FIGS. 1–4.

FIG. 6 is a plan view of the control console of FIG. 5, with an armrest in a raised position.

DETAILED DESCRIPTION

Figure 1:
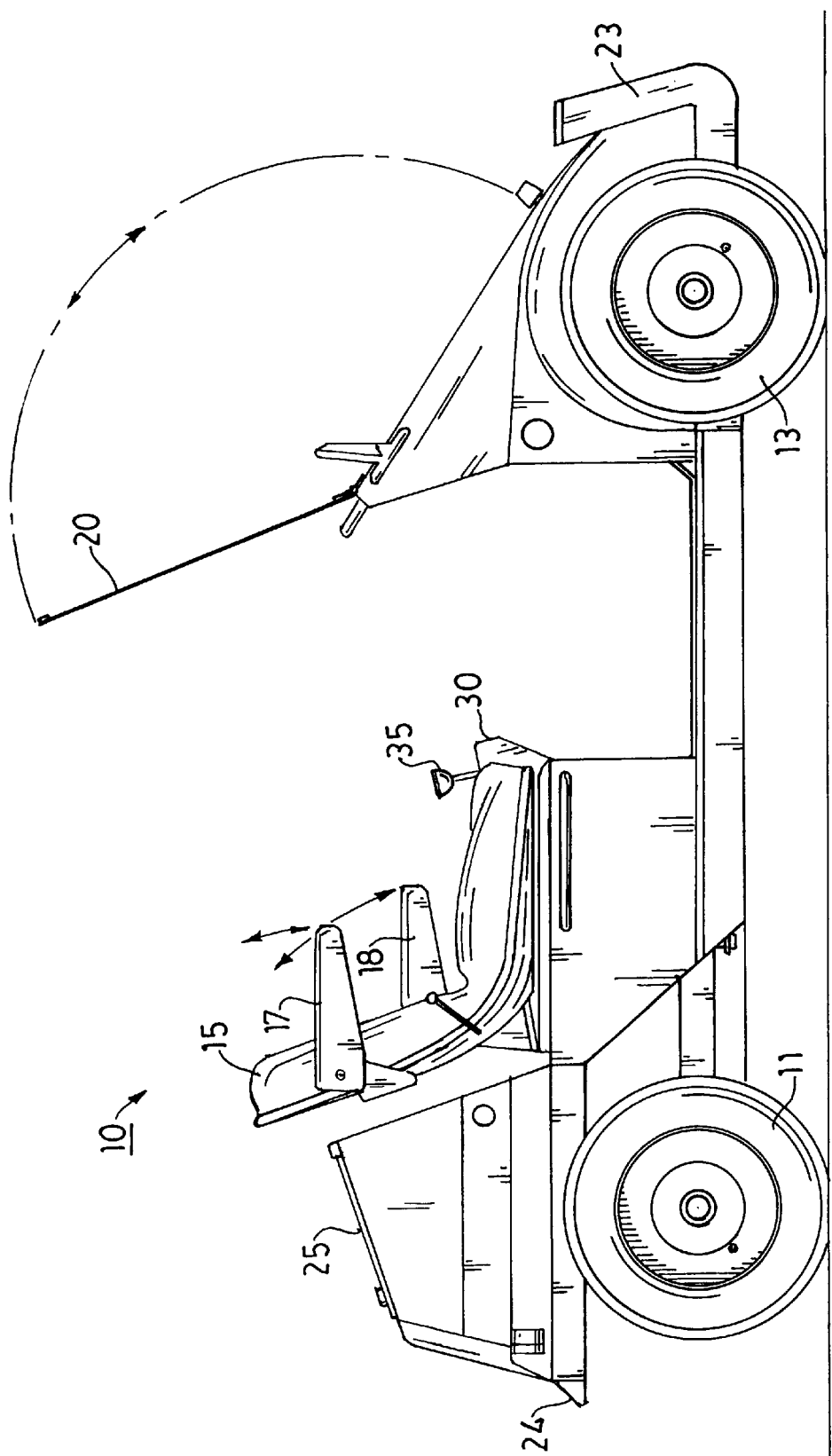
Figure 3:
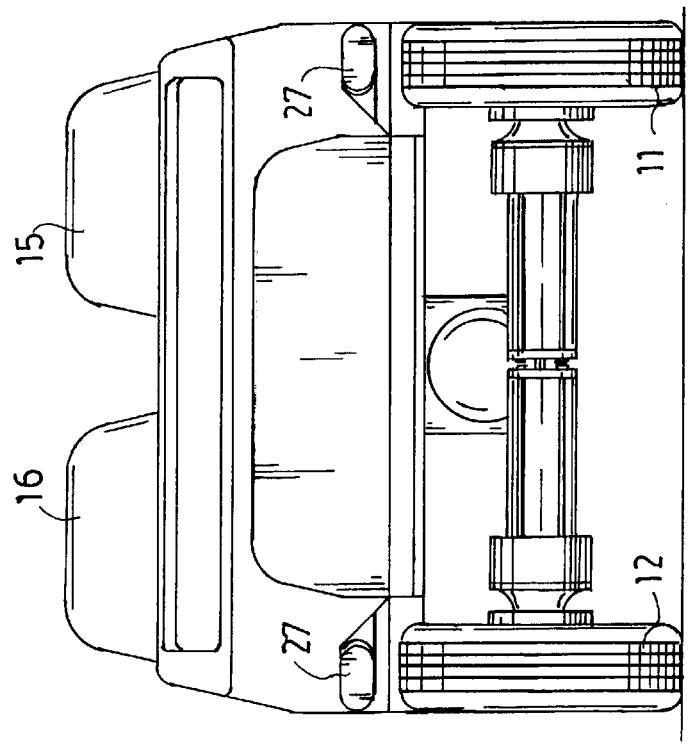
Figure 2:
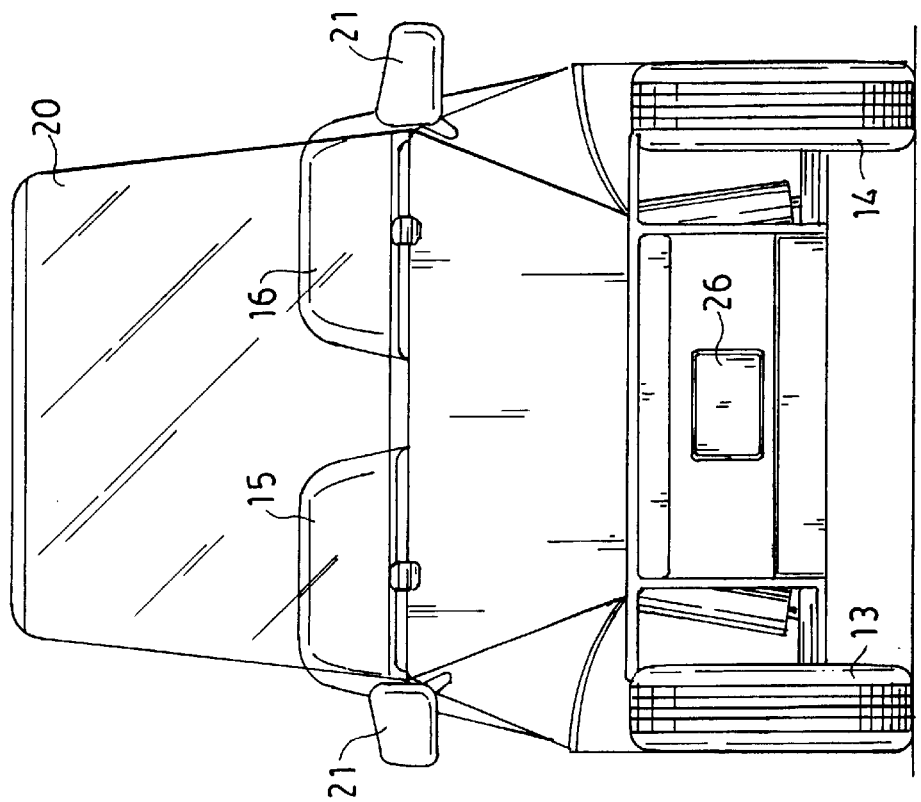
Figure 4:
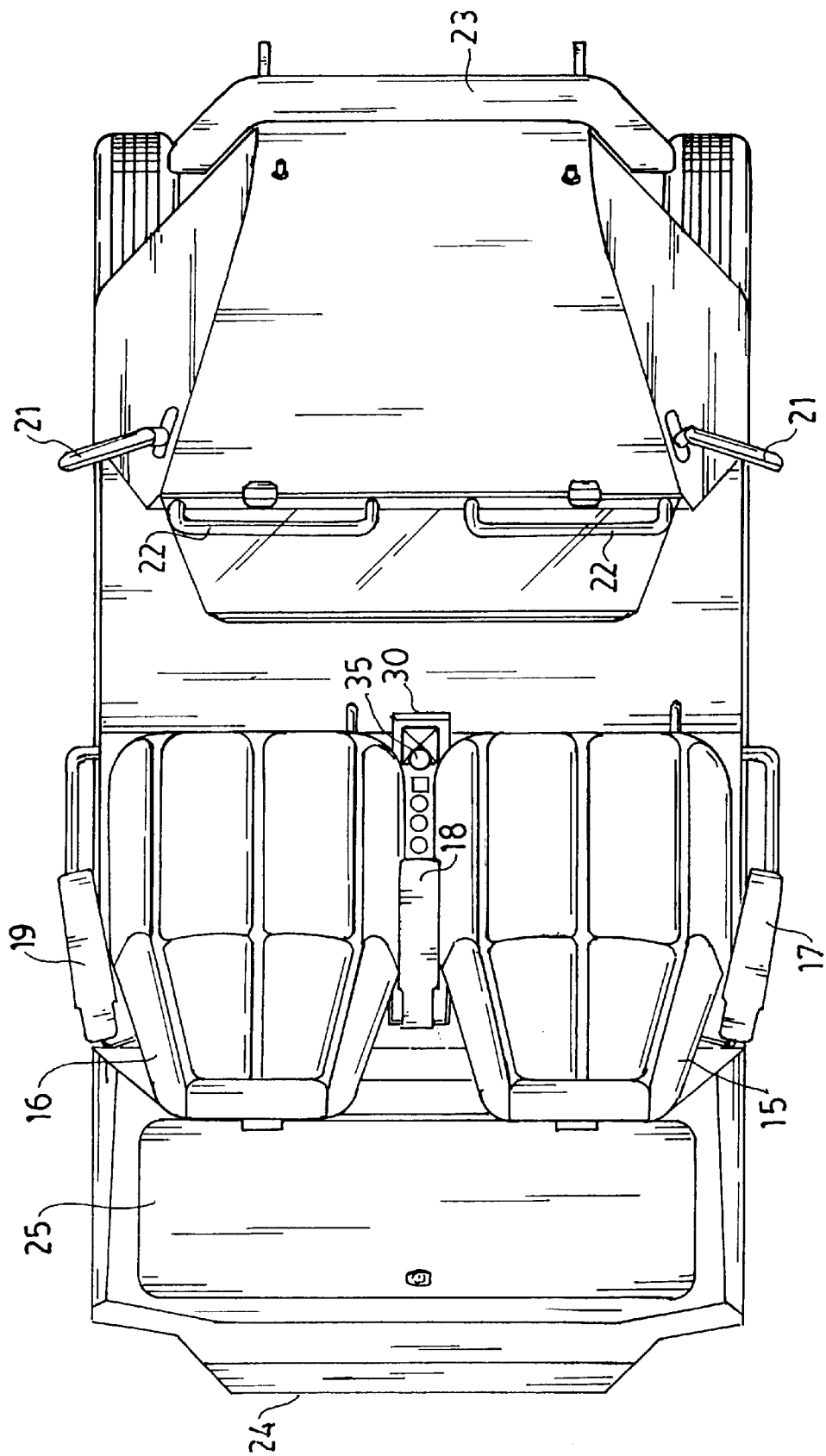

The vehicle 10, as illustrated in the drawings, is representative of an all-electric vehicle controlled by the inventive system. A variety of electrically driven vehicles differing significantly from the illustrated vehicle 10 can also be controlled in the inventive way so that many particulars of vehicle 10 are presented only to show how the control system operates and not to limit the invention to a particular vehicle.

As shown in FIGS. 1–4, vehicle 10 has a pair of driven and braked rear wheels 11 and 12 and a pair of steered front wheels 13 and 14. It accommodates one or two passengers in seats 15 and 16, either of which can be used by an operator for driving the vehicle. Seats 15 and 16 are preferably adjustable and arranged on opposite sides of a control console 30 that includes a joystick 35. Console 30, with joystick 35 and other controls explained below, provides an operator interface with a control system that electrically operates the vehicle so that all the vehicle functions controlled by an operator can be tended to with a single hand at console 30. This allows an operator in seat 16 to drive right-handed or an operator in seat 15 to drive left-handed. As explained below, the joystick and other operator inputs at the console cooperate with the control system to achieve a drive-by-wire vehicle.

Besides the inventive control system, vehicle 10 includes several amenities, such as folding armrests 17–19, a pivotally adjustable wind screen 20, mirrors 21, hand grips 22, bumpers 23 and 24, luggage space 25, head light 26, and tail lights 27. A canopy (not shown) can be included and can mount an array of photovoltaic cells. Luggage compartment 25 can be modified to accommodate many different objects.

Vehicle 10 is designed to be conveniently operated by people having physical disabilities, but can also be used as a runabout, golf car, or light-duty carrier serving people with or without disabilities. The control system also makes vehicle 10 readily controlled robotically to perform military and other remotely controlled services.

Every major component of the vehicle control system communicates with console 30. This produces many interrelationships that allow an operator to control all functions of the vehicle from the console, through controls and indicators preferably arranged on console 30 as follows.

From console 30, an operator using one hand controls all movements of vehicle 10, including the driving and braking of rear wheels 11 and 12 and the steering of front wheels 13 and 14. This is done principally by manipulating joystick 35, which moves a two-axis joystick controller 36. Fore and aft movement of joystick 35 adjusts a potentiometer 37 arranged on a transverse axis of controller 36 for directing forward and reverse vehicle movement. Lateral movement of joystick 35 adjusts another potentiometer 38 arranged in controller 36 on an axis aligned with vehicle 10 for controlling right and left steering of front wheels 13 and 14.

A dynamic brake switch 40, preferably in the form of a push-button, is arranged on console 30 for increasing the deceleration of vehicle 10 whenever necessary. Brake switch 40 can be depressed or tapped by an operator to actuate the electromagnetic brakes for slowing the vehicle faster than regenerative braking, which occurs in response to joystick 35. For this purpose, joystick 35 is spring biased toward a neutral or stopped position so that when joystick 35 is released, the vehicle is regeneratively brought to a stop. Dynamic braking with switch 40 can decelerate the vehicle even faster.

Figure 8:
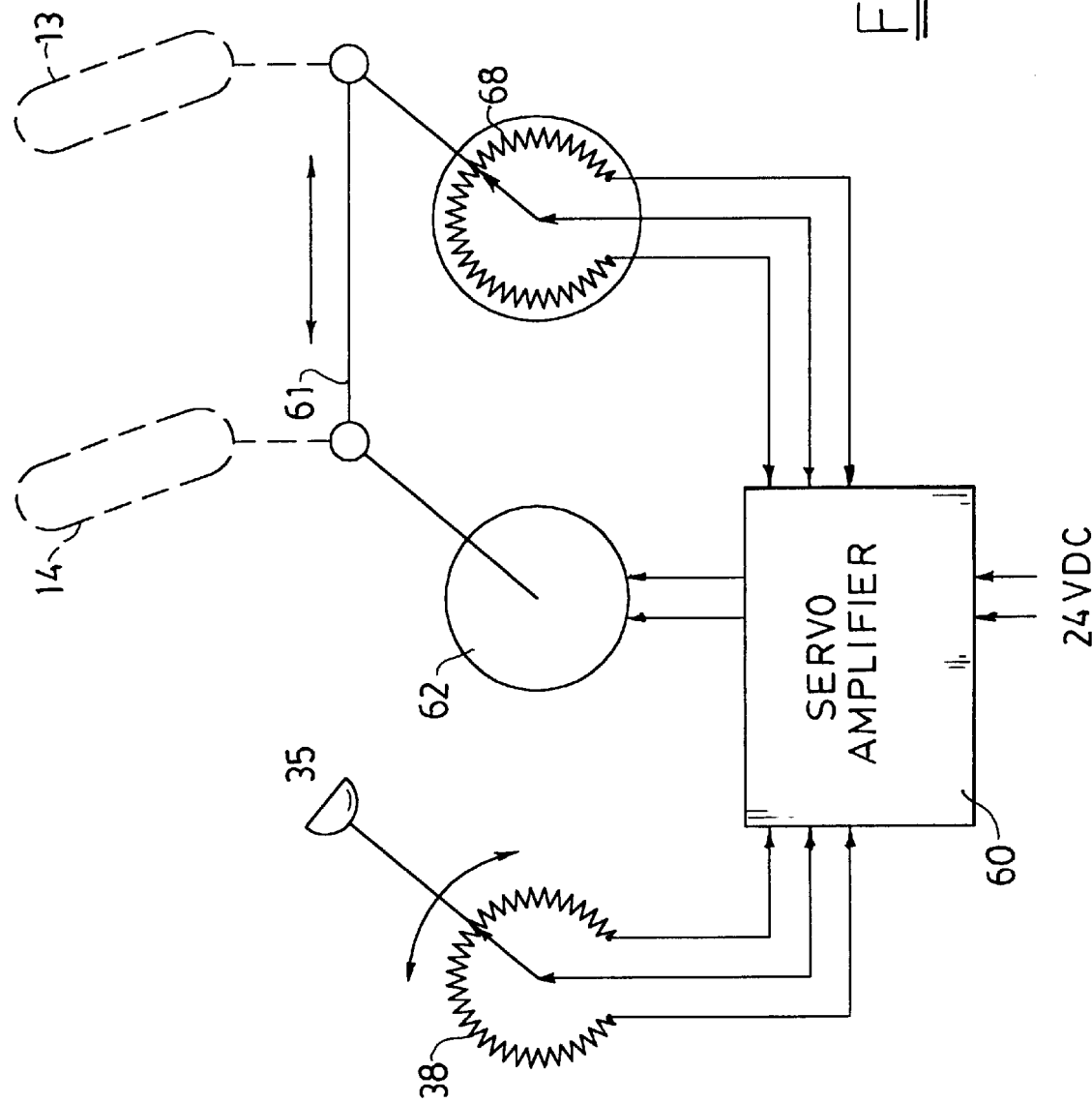
FIGS. 8 and 9 are schematic diagrams of preferred steering systems managed by the inventive control system.
Figure 9:
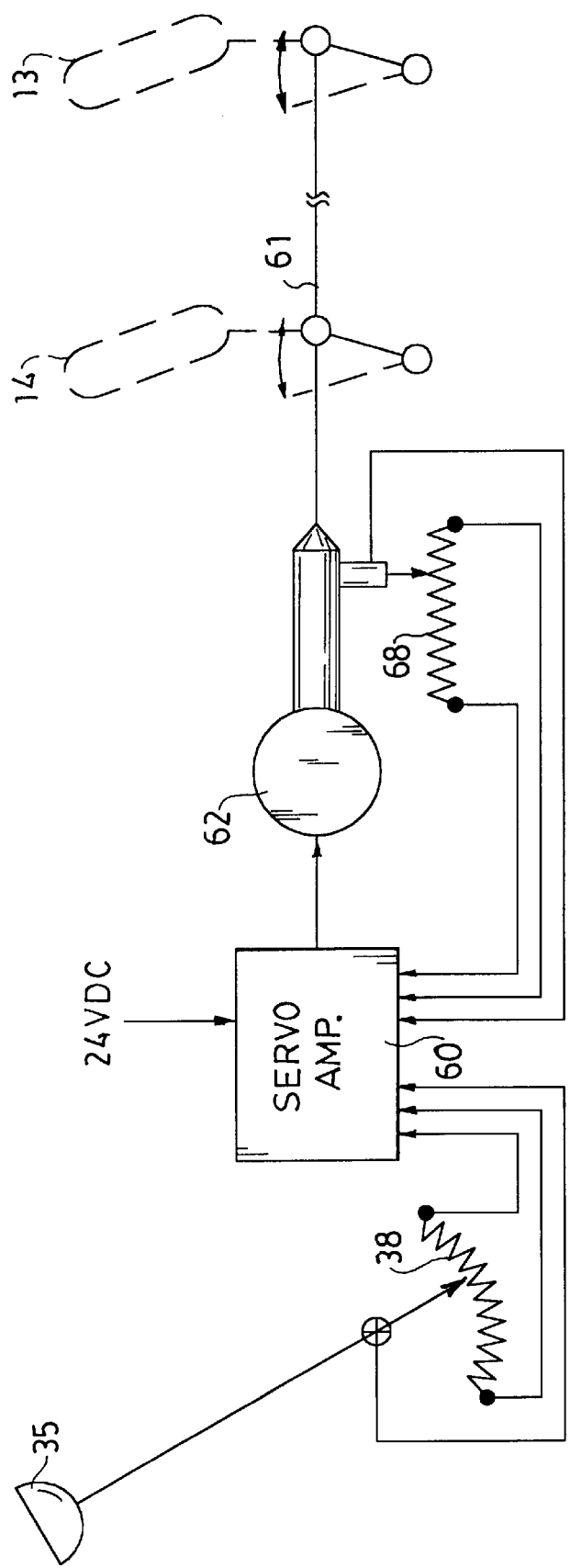

Console 30 also includes battery power meter 31 and power switch 32, which preferably has three positions for power ON, power OFF, and Battery Charge. Responsive to power switch 32 are a power on indicator 33 and a battery charge indicator 34. Also preferably included on console 30 are a parking brake override switch 41, a light switch 42, a horn button 43, and a speed limit adjustment 44. All the components of console 30 are interconnected with elements of the vehicle control system, including a wheel drive and braking system schematically illustrated in FIG. 7 and a steering system schematically illustrated in FIGS. 8 and 9.

Figure 7:
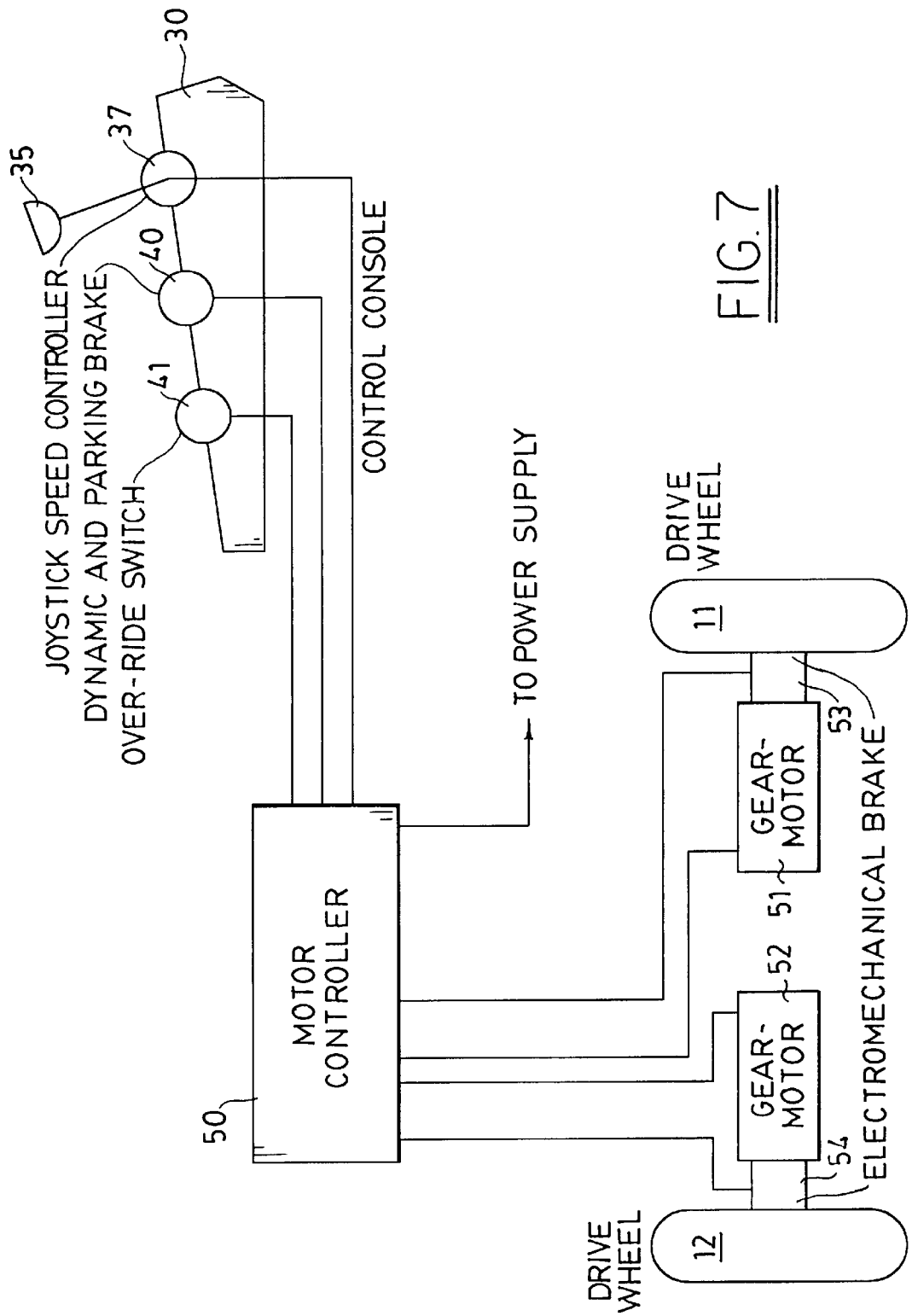
FIG. 7 is a schematic diagram of a preferred wheel driving and braking system managed by the inventive control system.

As shown in FIG. 7, rear wheels 11 and 12 are driven by respective gearmotors 51 and 52, and electromagnetic brakes 53 and 54 are interposed between each gearmotor and its respectively driven wheel. Brakes 53 and 54 are engaged for braking effect when electrically energized and are disengaged whenever electric energization stops. A motor controller 50 powers the driving and braking system in response to joystick 35, dynamic brake 40, and parking brake override switch 41. Motor controller 50 preferably uses MOSFET power circuitry for infinite control of output current to drive motors 51 and 52.

Figure 10:
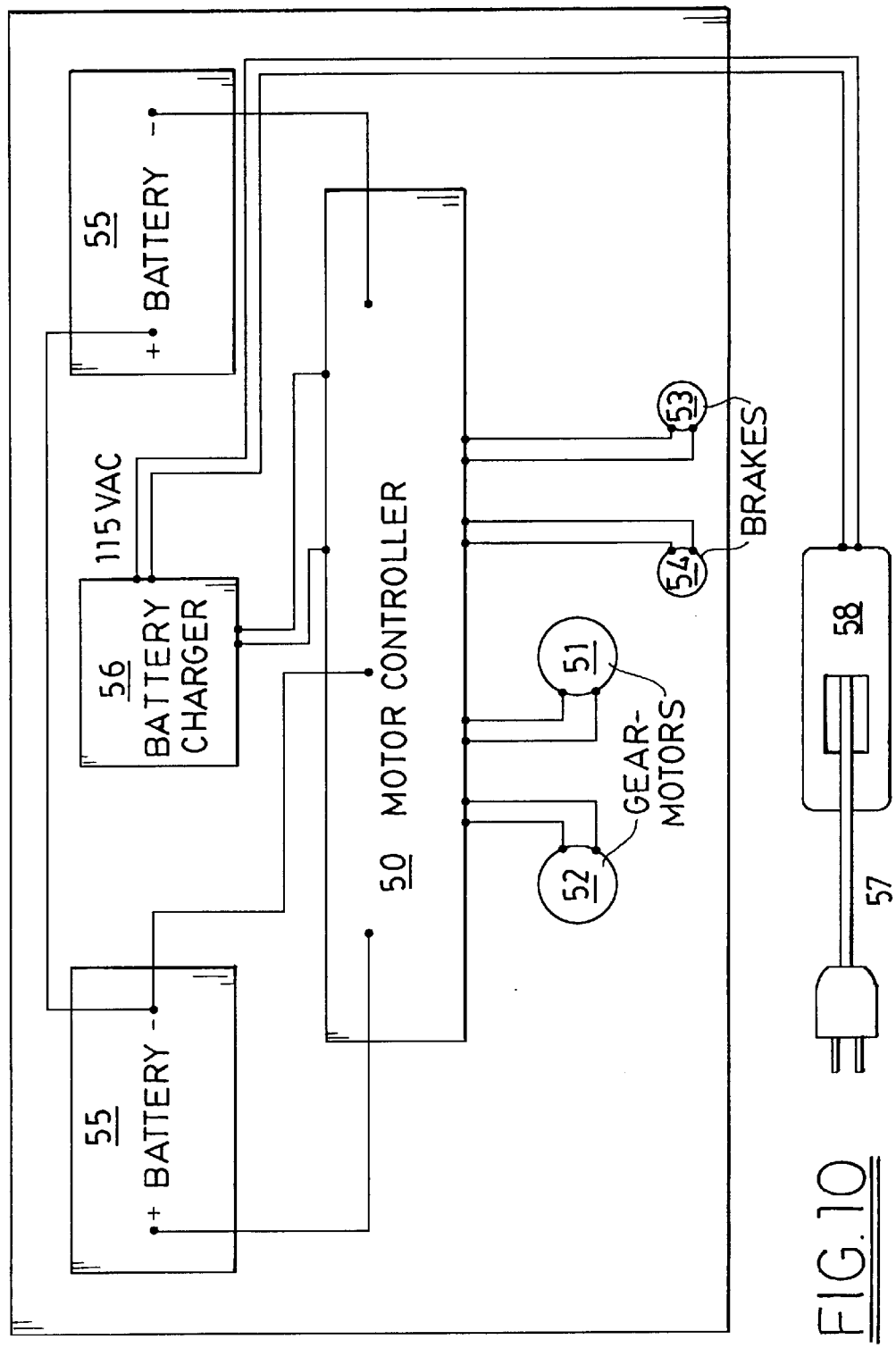
FIG. 10 is a schematic diagram of preferred elements of the inventive control system.

When joystick 35 calls for movement of the vehicle, motor controller 50 releases electromagnetic brakes 53 and 54 and energizes gearmotors 51 and 52 for the forward or reverse motion indicated. Vehicle motion continues as long as joystick 35 is held in an off-neutral position, to which joystick 35 is spring biased. If joystick 35 is released, it returns to its neutral or stop position in response to which motor controller 50 regeneratively brakes gearmotors 51 and 52 to stop the vehicle while returning energy to a vehicle battery 55 (FIG. 10).

A regenerative braking current from gearmotors 51 and 52 reduces to zero as the vehicle rolls to a stop; and in response to lack of regenerative braking current, motor controller 50 activates electromagnetic brakes 53 and 54 to hold drive wheels 11 and 12 in stopped positions. This holds the vehicle still, even on an incline, until movement of joystick 35 calls for further vehicle motion. When this happens, brakes 53 and 54 are released as gearmotors 51 and 52 are energized to set the vehicle moving.

Motor controller 50 is preferably adjustable for the acceleration rate used in setting the vehicle in motion, and such adjustment is preferably independent for forward and reverse motions. The acceleration rate adjustment of the circuitry of motor controller 50 sets an electronic ramp rate that gradually increases the current to motors 51 and 52, up to a maximum acceleration rate, to avoid harsh or jerky starts. Acceleration adjustment accommodates the vehicle for easy control by people with disabilities.

The deceleration rate adjustment of the controller 50 sets an electronic ramp rate that provides for adjusting the current decrease rate to the gearmotors 51 and 52. This adjustment controls the regenerative braking feedback from the gearmotors, thereby controlling deceleration of the vehicle. Consequently, quick and sudden stops are eliminated should the joystick suddenly be released. The maximum speed for the vehicle is also set by adjustment of motor controller 50, preferably via a speed limit setting 44 on console 30.

When power switch 32 is turned OFF, motor controller 50 activates electromagnetic brakes 53 and 54 so that the vehicle is held still in a parked position. Turning power switch 32 ON allows the brakes to be released by movement of joystick 35, for driving the vehicle away from a parked position. If the vehicle is to be moved from a parked position under external power, parking brake override switch 41 is activated on console 30 to release brakes 53 and 54.

Power switch 32 preferably also has a Charge position in which batteries 55 can be charged. For this purpose, a built-in battery charger 56 is connected with batteries 55 to receive electric power via extension cord 57, which is also arranged onboard vehicle 10. Cord 57 is preferably wound on a cord retractor reel 58 from which it can be pulled and plugged into an AC outlet. With cord 57 plugged in and power switch 32 set to the Charge position, batteries 55 are recharged by charger 56. The amount of charge on batteries 55 is visible in indicator 31, and illumination of battery charge light 34 shows that battery charging is in progress.

Electric steering control for vehicle 10 is part of the improved control system and also works from joystick 35. A servo amplifier 60 responsive to joystick 35 supplies electric steering power to an electromechanical steering mechanism that is positioned by a closed loop of a feedback system. This positions a steering mechanism such as a tie rod 61 that sets the aim of vehicle wheels 13 and 14 to correspond with the lateral position of joystick 35.

Potentiometer 38, which is set by the lateral position of joystick 35, provides a steering input signal to servo amplifier 60, which also receives a feedback position signal from feedback potentiometer 68 set by the steering position of tie rod 61. When the signals from potentiometers 38 and 68 are unequal, servo amplifier 60 energizes a steering control motor 62 to adjust the steering position to achieve equality in the signals from potentiometers 38 and 68. This sets the steered position of the vehicle wheels to match the lateral position of joystick 35.

The preferred steering motor 62 is a recirculating ball screw actuator that produces a linear motion used to adjust the steering position of tie rod 61. Motor 62 is driven by servo amplifier 60 whenever the signal from input potentiometer 38 differs from the feedback signal of potentiometer 68. Joystick 35 need only be moved when a change of steered wheel position is desired; and if joystick 35 is released, it returns to a null position, which brings the steered wheels back to straight ahead.

The inventive control system can be applied to many different electric drive vehicles. Different numbers of wheels can be driven and braked, for example; and steering can be accomplished with a single wheel or with an articulated vehicle. Having all the necessary vehicle functions be controlled electrically from a single console accommodates the vehicle to remote control service through which input signals are delivered from a distance.

I claim:

1. An all-electric vehicle control system comprising:
   a. a control console arranged between a pair of seats, either of which can be used by an operator for operating the vehicle;
   b. the console including operator interface controls sufficient for operating the vehicle, the controls including a joystick operable by an inboard hand of an operator sitting in one of the seats; and
   c. the operator interface controls being electrically interconnected with vehicle components including a battery, a pair of driving gear motors connected to a respective pair of vehicle drive wheels, a control system responsive to the joystick for controlling electric current to and from the gear motors for rotating and regeneratively braking the drive wheels, and a steering system responsive to the joystick for controlling a steering angle of a pair of steerable wheels of the vehicle.

2. The system of claim 1 wherein the vehicle includes a brake system responsive to the control system, and the operator interface controls include a dynamic brake switch communicating with the control system for use by the operator for increasing deceleration of the vehicle.

3. The system of claim 2 wherein the operator interface controls include a power switch activating a parking brake and a parking brake override switch.

4. The system of claim 1 wherein the vehicle includes a battery recharger, and the operator interface controls include a power switch that can be switched to a charge position for recharging the battery.

5. The system of claim 4 wherein the vehicle includes an extension cord connected to the battery recharger and mounted on a cord retractor reel.

6. The system of claim 1 wherein the vehicle includes a lighting system, and the operator interface controls include a light switch.

7. The system of claim 1 wherein the steering system is an all-electric servo system with potentiometer feedback.

8. The system of claim 1 wherein the joystick is spring biased to neutral positions signaling a straight-ahead aim for the steering wheels and a stop for the drive motors.

9. The system of claim 1 wherein the control system is adjustable for vehicle acceleration.

10. The system of claim 1 wherein the steering system is adjustable for steering speed.

11. The system of claim 1 wherein the control system is adjustable for vehicle deceleration.

12. A console-controlled electrical vehicle comprising:
    a. operator interface controls including a joystick arranged on a control console between a pair of seats, either of which can be used by an operator of the vehicle;
    b. the vehicle having a pair of electric drive gear motors arranged for rotating a respective pair of vehicle wheels and having electromagnetically applied brakes arranged between each of the gear motors and a respectively driven vehicle wheel;
    c. a control system responsive to the joystick and communicating with the motors for rotating and for regeneratively braking the vehicle wheels;
    d. the electromagnetically actuated brakes being applied by the control system whenever the vehicle wheels are not rotating and being released by the control system whenever current is applied to the motors to rotate the vehicle wheels; and
    e. the operator interface controls including a dynamic brake switch interconnected with the control system for actuating the electromagnetic brakes to increase deceleration of the vehicle.

13. The vehicle of claim 12 wherein the dynamic brake switch is a push-button.

14. The vehicle of claim 12 wherein the operator interface controls include a power switch actuating the brakes in an off position and a parking brake override switch for releasing the brakes.

15. The vehicle of claim 12 wherein the control system includes acceleration adjustment.

16. The vehicle of claim 12 including a steering system responsive to the joystick for electrically aiming steerable wheels of the vehicle.

17. The vehicle of claim 16 wherein the steering system includes a steering speed adjustment.

18. The vehicle of claim 12 wherein the motors are electrically powered in parallel for rotating differentially as the vehicle turns.

19. The vehicle of claim 12 wherein the control system includes deceleration adjustment.

20. A method of controlling an all-electric vehicle, the method comprising:
    a. operating the vehicle by sitting in either of a pair of seats so that an inboard hand of an operator controls the position of a joystick arranged between the seats;
    b. controlling acceleration and deceleration of a driven pair of vehicle wheels in response to the joystick so that wheels are rotated at adjustable acceleration rates and are regeneratively decelerated;
    c. electromagnetically actuating wheel brakes whenever vehicle wheels stop rotating;
    d. releasing the wheel brakes whenever motors are energized to rotate vehicle wheels; and
    e. electromagnetically actuating the wheel brakes in response to a dynamic brake switch arranged between the seats and actuated by the operator for increasing deceleration of the vehicle.

21. The method of claim 20 including actuating the electromagnetic brakes in response to a power off switch and releasing the brakes in response to a parking brake override switch.

22. The method of claim 20 including electrically powering in parallel a pair of drive motors driving wheels on opposite sides of the vehicle.

23. The method of claim 20 including aiming steerable wheels of the vehicle in response to a position of the joystick.

* * * * *